R. DUDLEY.
TORSION SPRINGS FOR VEHICLES.

No. 187,606. Patented Feb. 20, 1877.

Witnesses:
Edwin James
John R. Jones

Inventor:
Richard Dudley.
per J. E. P. Holmead
Attorney.

UNITED STATES PATENT OFFICE.

RICHARD DUDLEY, OF ERIE, PENNSYLVANIA.

IMPROVEMENT IN TORSION-SPRINGS FOR VEHICLES.

Specification forming part of Letters Patent No. 187,606, dated February 20, 1877; application filed October 15, 1875.

*To all whom it may concern:*

Be it known that I, RICHARD DUDLEY, of the city and county of Erie, and State of Pennsylvania, have invented certain Improvements in Torsion-Springs, of which the following is a full, clear, and exact description, reference being had to the accompanying drawing, and the letters of reference marked thereon, making part of this specification, in which—

Figure 1:
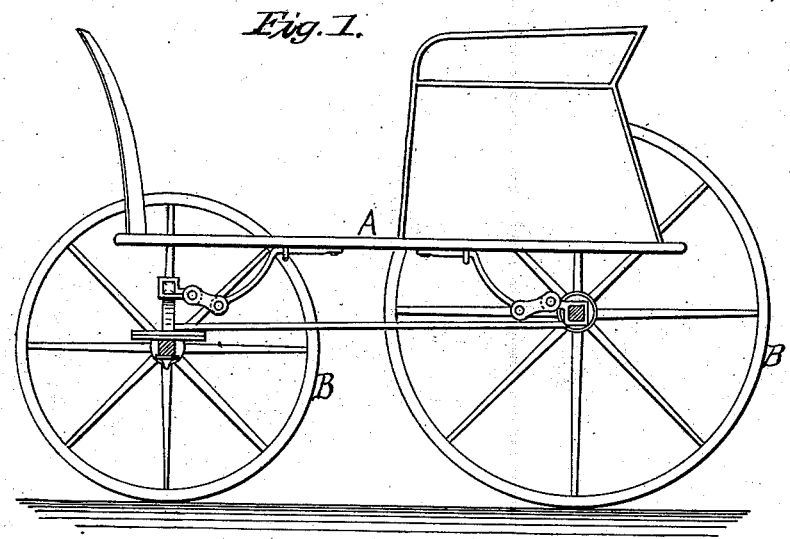
Figure 2:
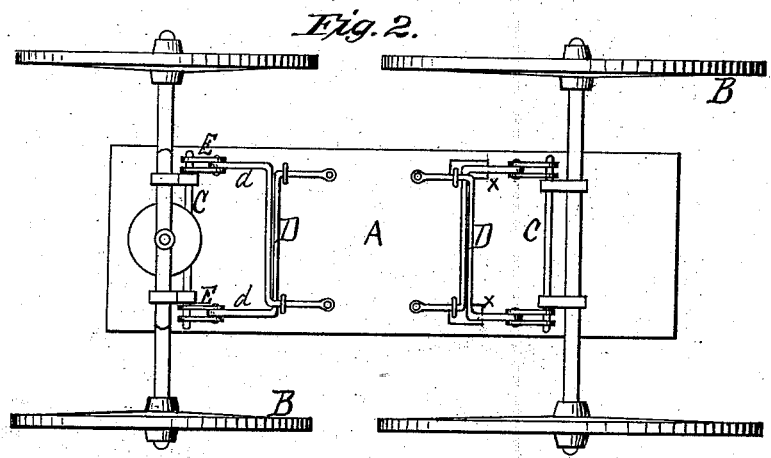
Figure 3:
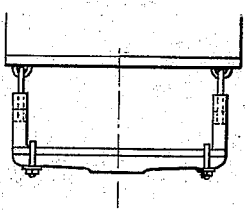
Figure 4:
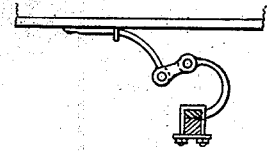
Figure 5:
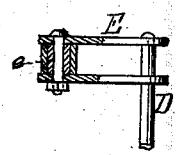

Figure 1 is a side view of a buggy with the springs attached. Fig. 2 is a bottom-plan view. Figs. 3 and 4 show modifications of the spring. Fig. 5 is an enlarged detached view of the thimble.

My invention consists in so arranging torsional springs in connection with the running-gear of a wagon as to cause said springs, in addition to their ordinary function, to also act as equalizers, so that when pressure is applied at any one point of the vehicle the body will yield in a uniform manner.

To accomplish this my invention consists in connecting a rocking shaft to the lateral lever-arms of torsion-springs, in such manner that when pressure is applied to the vehicle the rocking shaft shall, through the depression of the lateral lever-arms, cause the springs to act simultaneously in developing their torsional action, thus providing an equalizer.

The construction and operation of my invention are as follows: A is the body, and B B are the wheels of a buggy, constructed in any ordinary style and of any suitable material. In Fig. 2 is shown the bottom of the buggy inverted, and my arrangement of spring, and where C C represent rocking shafts, connected, by a suitable bearing, with the axles. D D are torsion-springs, arranged in duplicates at each end of the body, resting on and working in rawhide bearings $x\,x$, the lateral lever-arms $d\,d$ of said springs being connected with the rocking shafts C C through links E E.

The form and arrangement of springs, as shown in the drawing, are most admirably adapted for my purpose; but there is nothing arbitrary about it, as other styles of spring might be used, my object simply being to connect the rotating arm with the lateral lever-arm of the springs by means of links E E, so as to provide an equalizer.

In Fig. 5 is shown, at $e\,e$, a brass cylindrical bushing, which not only prevents the wearing away of the bearing, but which also renders the same comparatively noiseless in action.

What I claim as new, and desire to secure by Letters Patent of the United States, is—

In combination with the body of a vehicle, rocking shafts C C and torsion-springs D D, connected by links E E, to operate substantially as described.

In testimony whereof I have signed my name to this specification in the presence of two subscribing witnesses.

RICHARD DUDLEY.

Witnesses:
 EDWIN JAMES,
 J. W. HAMILTON JOHNSON.